(12) United States Patent
de Fresart et al.

(10) Patent No.: US 11,414,827 B2
(45) Date of Patent: Aug. 16, 2022

(54) ANCHOR FOR SUPPORT STRUCTURE

(71) Applicant: ARRAY TECHNOLOGIES, INC., Albuquerque, NM (US)

(72) Inventors: Benjamin C. de Fresart, Albuquerque, NM (US); Nikhil Kumar, Albuquerque, NM (US); Anubhav Tandon, Albuquerque, NM (US); Lucas Creasy, Scottsdale, AZ (US); Nathan Schuknecht, Golden, CO (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 17/474,163

(22) Filed: Sep. 14, 2021

(65) Prior Publication Data

US 2022/0081862 A1 Mar. 17, 2022

Related U.S. Application Data

(60) Provisional application No. 63/078,169, filed on Sep. 14, 2020.

(51) Int. Cl.
*E02D 5/80* (2006.01)

(52) U.S. Cl.
CPC .................... *E02D 5/803* (2013.01)

(58) Field of Classification Search
CPC combination set(s) only.
See application file for complete search history.

(56) References Cited

U.S. PATENT DOCUMENTS

| 3,066,769 | A | * | 12/1962 | Pasquale | ............. E04H 12/2215 |
| | | | | | 52/153 |
| 4,471,588 | A | * | 9/1984 | Schirm | .................... E02D 5/801 |
| | | | | | 52/154 |
| 5,026,213 | A | * | 6/1991 | Habib | ..................... E02D 5/803 |
| | | | | | 405/229 |
| 6,263,622 | B1 | | 7/2001 | Griffin et al. | |
| 2002/0088186 | A1 | | 7/2002 | Cusimano et al. | |
| 2010/0139649 | A1 | | 6/2010 | Almy et al. | |
| 2018/0148901 | A1 | * | 5/2018 | Kemp | ..................... E02D 5/223 |
| 2020/0248424 | A1 | | 8/2020 | Hudson et al. | |

OTHER PUBLICATIONS

International Search Report dated Dec. 29, 2021 for International Application No. PCT/US2021/050318.
International Search Report dated Dec. 23, 2021 for International Application No. PCT/US2021/050318.

* cited by examiner

*Primary Examiner* — Kyle Armstrong
(74) *Attorney, Agent, or Firm* — Maschoff Brennan

(57) ABSTRACT

A first embodiment of an anchor system may include a ballast, rods projecting through the ballast such that the rods extend away from the ballast and into the ground when deployed, and a mounting hardware atop the ballast. The anchor system may include an anchor deployable into the ground with a line providing tension between the ballast and the anchor when deployed into the ground. Another embodiment of the anchor may include a ground plate coupled to a spade in which the spade may be pressed into the ground when deployed. The anchor system may include an earth anchor shaped to be deployed in a first position and resist removal from the ground in a second position, and a line running from the ground plate to the earth anchor. The tension on the line may cause the earth anchor to transition from the first position to the second position.

20 Claims, 12 Drawing Sheets

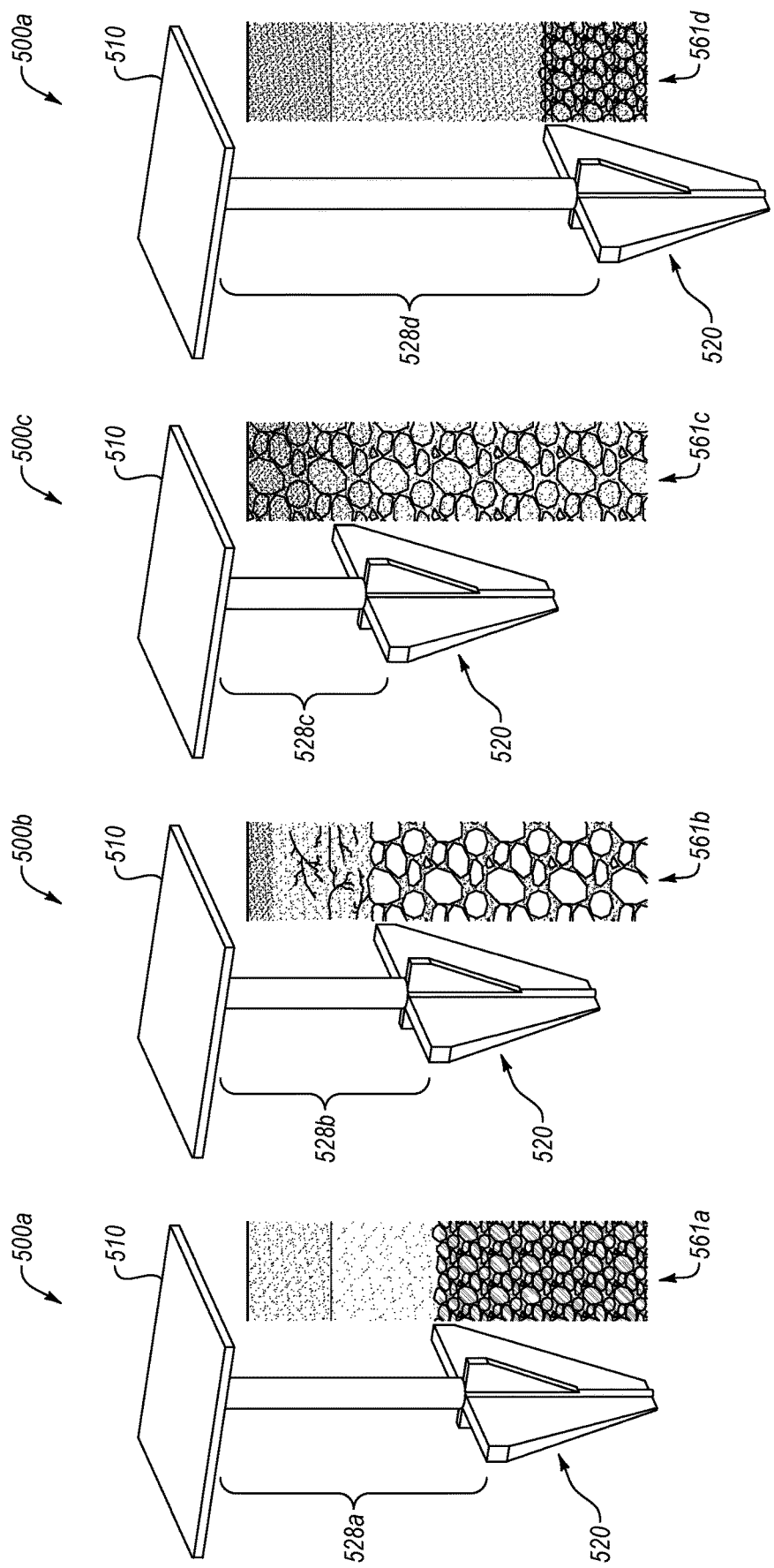

ANCHOR FOR SUPPORT STRUCTURE

CROSS-REFERENCE TO RELATED APPLICATION

This application claims the benefit of U.S. Patent Application Ser. No. 63/078,169, filed on Sep. 14, 2020; the disclosure of which is incorporated herein by reference in its entirety.

THE FIELD OF THE DISCLOSURE

The present disclosure relates to anchors for support structures. Such support structures can be used to support arrays of solar energy-producing equipment.

BACKGROUND

Most photovoltaic ("PV") modules are quite heavy because they use glass to encase the PV cells. A solar tracking system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. This can require motors with significant power that rotate the support structures to which the PV modules are mounted.

The subject matter claimed herein is not limited to embodiments that solve any disadvantages or that operate only in environments such as those described above. Rather, this section is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One or more embodiments of the present disclosure may include an anchor system that includes a base member that includes stabilizing shafts projecting through the base member such that in a deployed position, the stabilizing shafts extend away from the base member and into the ground. The anchor system may also include an anchor deployable into the ground with a line for providing tension between the base member and the anchor when deployed into the ground. The anchor system may additionally include mounting hardware atop the base member.

One or more embodiments of the present disclosure may include an anchor system that includes a base member with a stabilizing shaft coupled to the base member to be pressed into the ground when deployed. The anchor system may also include an earth anchor shaped to be deployed in a first position, and resist removal from the ground in a second position. The anchor system may also include a line running from the base member to the earth anchor in which application of tension on the line causes the earth anchor to transition from the first position to the second position.

One or more embodiments of the present disclosure may include an anchor system that includes a base member with a stabilizing shaft coupled to the base member to be pressed into the ground when deployed. The anchor system may also include a line running from the base member to a threaded portion of the line in which the threaded portion of the line is shaped to be driven into the ground by rotating a portion of the line above the threaded portion to affect rotation of the threaded portion of the line.

Additional features and advantages of the disclosure will be set forth in the description which follows, and in part will be apparent from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which:

FIGS. 5A-5D illustrate various configurations of a neck of example anchor systems in accordance with the present disclosure;

DETAILED DESCRIPTION

Figure 1:
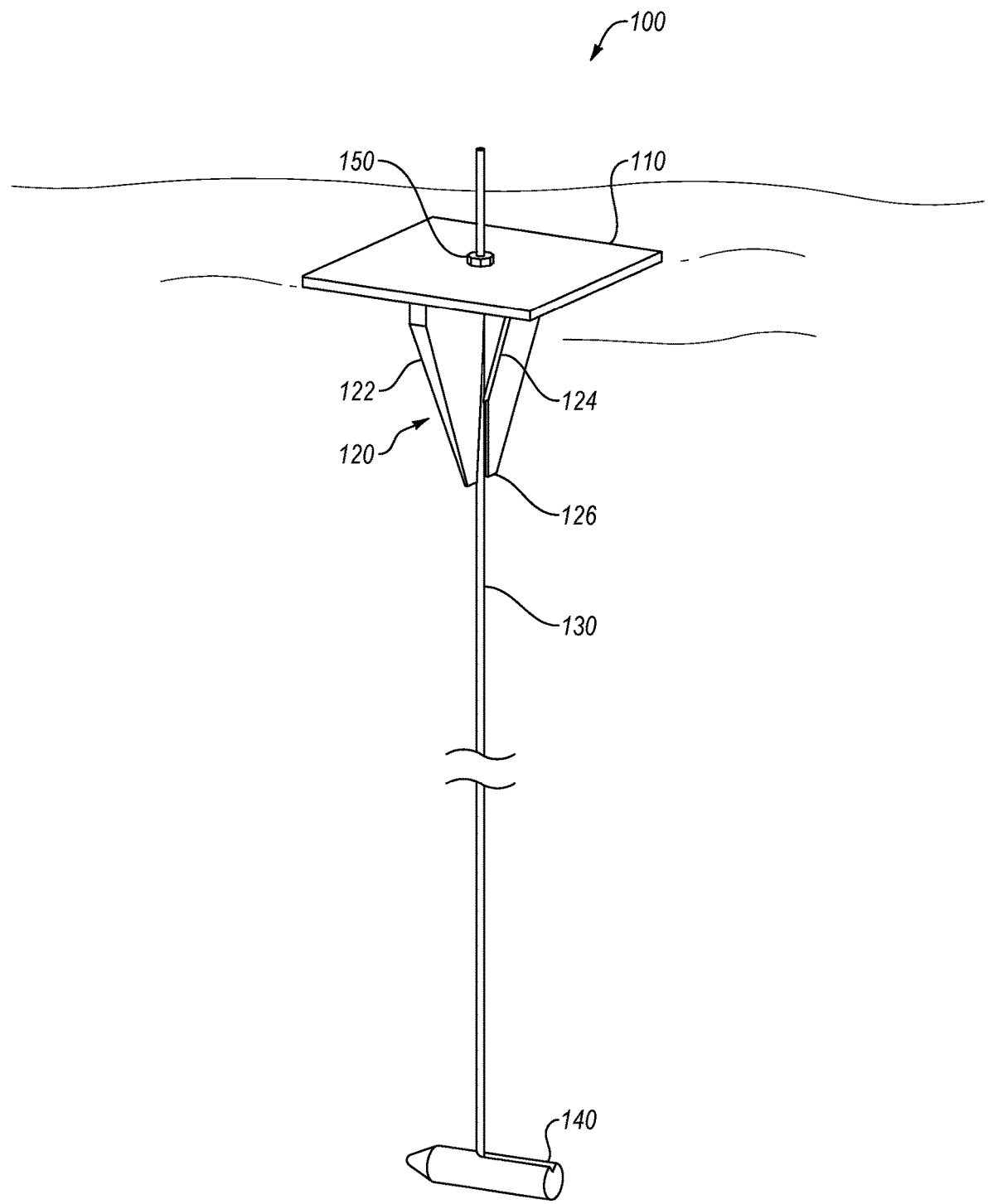
FIG. 1 illustrates an example embodiment of an anchor system in accordance with the present disclosure.

Combinations of natural forces and/or rotational forces on the support structures of photovoltaic (PV) modules, such as torque tubes, may put great strain on the support structure, resulting in the use of deep piles or other similar approaches to keep the support structure of the PV modules anchored to the ground. However, there is a need for improved anchoring structures to withstand the applicable forces and improve efficiency and/or costs when installing the anchoring structures and/or support structures.

The present disclosure relates to improvements in anchor systems for support structures. Such support structures may include framework, torque tubes, motors, etc. that are typically deployed above ground to support and rotate PV modules in an array of such modules, and such anchor systems may include any of the components used in deploying and/or anchoring the support structures within the earth such that the support structures remain in place and do not move or give way to environmental or other forces. For example, anchor systems can include piles, earth anchors, screw anchors, etc. that may go deep into the ground with one or more components projecting out of the ground to which the support structure can be attached. Traditionally, earth anchors and screw anchors have not been used for arrays of PV modules, particularly those that use any sort of tracking technique, because of the transverse loads (those parallel to the ground) that are experienced by the arrays of PV modules as earth anchors and/or screw anchors are designed to handle vertical loads (those orthogonal to the ground) and have very little resistance, if any, to transverse loads. Rather, deep piles are driven into the ground which require expensive, heavy machinery, and are driven to a depth deeper than screw anchors or earth anchors and thus are more likely to run into cobbles or boulders in the ground. Both factors make installation using piles expensive. In one or more embodiments of the present disclosure, an anchor system is provided by which earth anchors and screw anchors become viable for anchoring support structures for arrays of PV modules by being able to handle such transverse loads.

In some embodiments, an anchor system may include a base member (e.g., a ground plate, a ballast, etc.) with a stabilizing shaft (e.g., a spade, a rod, etc.) attached to the bottom of the ground plate. The stabilizing shaft may be oriented to counteract the forces applied to the anchor system, such as the transverse loads. The base member may be fixedly coupled to an earth anchor, screw anchor, or other element driven into the ground that resists removal from the ground.

In some embodiments, the anchor system may include a rigid neck between a ground plate and a spade to position the spade deeper in the earth with the ground plate pressed against the surface of the ground. The orientation and/or size of the spade, size and/or shape of the ground plate, the length of the rigid neck, etc. may be varied or customized based on the ground conditions, the environment within which the array of PV modules is deployed, a size of the array of PV modules, etc.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as examples, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

FIG. 1 illustrates an example embodiment of an anchor system 100 in accordance with the present disclosure. The anchor system 100 may be configured to provide stability to a support structure (not shown) that is attached to the anchor system 100 to keep the support structure anchored in place to the ground. The anchor system 100 may include a ground plate 110 with a spade 120 on the bottom side of the ground plate. A line 130 may run from the ground plate 110 to an earth anchor 140.

The ground plate 110 may include a flat, rigid piece of material that may be shaped to press against the surface of the ground. For example, the ground plate 110 may be made of metal (e.g., stainless steel, iron, aluminum, galvanized steel, alloys thereof, etc.), sturdy plastic, or any other material able to withstand the forces applied by the anchor system 100 and the array of PV modules attached via the support structure. The ground plate 110 may be shaped and/or sized based on the ground conditions and/or the orientation of the array. For example, when tracking the sun, support structures may be rotated from East to West. The orientation of the PV modules may cause increased wind forces on the PV modules which may in turn cause increased forces on the anchor system 100 in the East-West direction. To counteract these forces, the ground plate 110 may be sized and/or positioned to have an increased surface area and/or length in the East-West direction to distribute the forces more effectively and reduce the likelihood of material failure in the anchor system 100. Although the anchor system 100 is illustrated and described with respect to an East-West orientation, it may be appreciated that the orientation and/or configuration of components of the anchor system 100 may be implemented to resist forces coming from any direction, such as forces in a North-South direction, a Northeast-Southwest direction, and/or a Northwest-Southeast direction.

The spade 120 may be fixedly coupled to the bottom of the ground plate 110 and/or be a unitary body with the ground plate 110 (e.g., the spade 120 and the ground plate 110 may be a single component with two functional regions of the ground plate 110 and the spade 120). The spade 120 may be made of a similar or comparable material to that of the ground plate 110. For example, in some embodiments the ground plate 110 is made of anodized aluminum and the spade 120 is made of stainless steel. In some embodiments, the spade 120 may include a major panel 122 that may have a broad surface area facing in one direction. The spade 120 may or may not include a minor panel 124 that may have a smaller surface area facing in an orthogonal direction (or other direction) from the major panel 122. The major panel 122 and/or the minor panel 124 may come to a point 126 (e.g., may taper along a portion or the entire length of the major panel 122). The point 126 may facilitate driving of the spade 120 into the ground.

In some embodiments, the spade 120 may be oriented with the major panel 122 facing in an East-West direction when deployed such that the wide face may facilitate resistance of or counteracting of the transverse forces imposed by rotation of support structures (e.g., rotational forces applied to torque tubes by the wind). For example, the spade 120 may facilitate distribution of the forces imposed by rotating the support structure rather than applying those forces exclusively to the line 130 and/or the ground plate 110. In these and other embodiments, the spade 120 may be driven into the ground to the desired depth. This can be accomplished using any driving mechanism, including manual labor or force to drive the spade 120 into the ground, machinery to force the spade 120 into the ground (e.g., a pneumatic hammer), during the act of tensioning the line 130, during the act of setting the nut 150, or any other approach.

The line 130 may include a physical connection between the ground plate 110 and the earth anchor 140. The line 130 may be steel or other metal rope/cable, a plastic or other polymeric rope/cable, a solid column of material rather than being braided, twisted, or woven filaments/fibers, etc. The line 130 may be selected to have strong tensile strength in a longitudinal direction (e.g., in the direction from the ground plate 110 to the earth anchor 140).

The earth anchor 140 may include a device shaped to facilitate travel through the earth when being driven to a desired depth and shaped to resist being removed from the ground in the opposite direction. For example, the earth anchor may have a conical shape, a triangular shape, or any other shape that is narrower at one end and broader at the other. In some embodiments, just a tip of the earth anchor 140 may include the conical, triangular, etc. shape. As illustrated in FIG. 1, in some embodiments the earth anchor 140 may be rotatably coupled to the line 130 along a central portion of the length of the earth anchor and may include a void in material within which the line 130 may be disposed when driving the earth anchor 140 into the ground. After arriving at the desired depth, applying tension to the line 130 may cause the earth anchor 140 to rotate about the point at which the earth anchor 140 is rotatably coupled to the line 130. This may cause the earth anchor 140 to resist withdrawal from the ground as the surface area of the earth anchor 140 against the force of the line 130 becomes much larger after rotating to the deployed position (e.g., the position as shown in FIG. 1). A nut 150 or other fixing mechanism may be used to lock the line 130 and/or the earth anchor 140 relative to the ground plate 110 by adding additional tension to the line 130.

In operation when installing the anchor system 100, the earth anchor 140 may be rotatably coupled to the line 130 (or may arrive at a site for installation pre-loaded/coupled). The earth anchor 140 may be driven into the ground to the desired depth. This can be accomplished using any driving mechanism, including manual labor or force to drive the earth anchor 140 into the ground, machinery to force the earth anchor 140 into the ground (e.g., a pneumatic hammer), some charge or explosive force behind the earth anchor 140 to drive the earth anchor 140 into the ground, or any other approach.

After being placed at the desired depth, the line 130 may be fed through a hole in the ground plate 110 and the ground plate 110 may be positioned with the spade 120 in the desired orientation (e.g., with the major panel 122 facing an E-W direction). The ground plate 110 may then be inserted into the ground by forcing the spade 120 into the ground until the ground plate 110 is resting against the surface of the ground. The nut 150 may then be threaded down the line 130 until it is proximate the ground plate 110 and forces the ground plate 110 into the surface of the ground (e.g., using a hydraulic tensioner or nut driver) while adding more tension to the line 130. The tension to the line 130 may cause the earth anchor 140 to rotate relative to the line 130 to the position shown in FIG. 1. By being in the position shown in FIG. 1, the earth anchor 140 may resist being pulled out of the ground and may provide stability to the ground plate 110. Additionally, the use of the spade 120 may prevent material failure of the line 130 and/or the ground plate 110 due to environmental forces and/or forces caused by rotating the support structures of a PV array. In some embodiments, the use of the nut 150 may facilitate seating the ground plate 110 against the ground rather than being used after the ground plate 110 is against the ground.

In some embodiments, the line 130 may be threaded such that the nut 150 may be threaded down the line 130. Additionally or alternatively, the nut 150 may have teeth to cut its own threads into the line 130, or any other mechanism that permits the nut 150 to move down the line, forcing the ground plate 110 into the ground and adding more tension to the line 130. For example, other devices may be used as the nut 150 or in place of the nut 150, such as a tooth lock washer, a press nut, etc.

In some embodiments, connecting features such as bolts, hex nuts, screws, beams, I-beams, purlins, etc. may extend away from the ground on a top surface of the ground plate 110 to facilitate attaching of the support structures for the PV array to the ground plate 110.

Additionally or alternatively, the ground plate 110 may include a hollow portion (e.g., a hollowed center) that is shaped and sized to accommodate the spade 120 and/or the earth anchor 140. For example, the ground plate 110 may include a hole large enough for the spade 120 and/or the earth anchor 140 to extend through towards the ground. In these and other embodiments, the hollow portion of the ground plate 110 may act as a guide when deploying the spade 120 and/or the earth anchor 140. For example, the spade 120 may include a lip around the end opposite the point 126 that is larger than the hole for the spade 120 in the ground plate 110 such that the main body of the spade 120 may pass through the hole while the lip catches and holds on the ground plate 110. As another example, the spade 120 and ground plate 110 may be a single physical component with a hollow portion to accommodate the earth anchor 140 and the line 130. When deploying the spade 120 and/or the ground plate 110, the spade 120 may be positioned so that the major panel 122 is oriented to face in an East-West direction, and the ground plate 110 may be forced into the ground (e.g., via pounding with a tool, stomping with a boot, etc.). After the ground plate 110 is against the surface of the ground, the earth anchor 140 may be placed within the hollow, and a force may be applied to the earth anchor 140 to drive the earth anchor 140 into the ground in a position aligned with the ground plate 110. For example, a pile driver or other tool that fits within the hollow may be used to force the earth anchor 140 into the ground.

Figure 2:
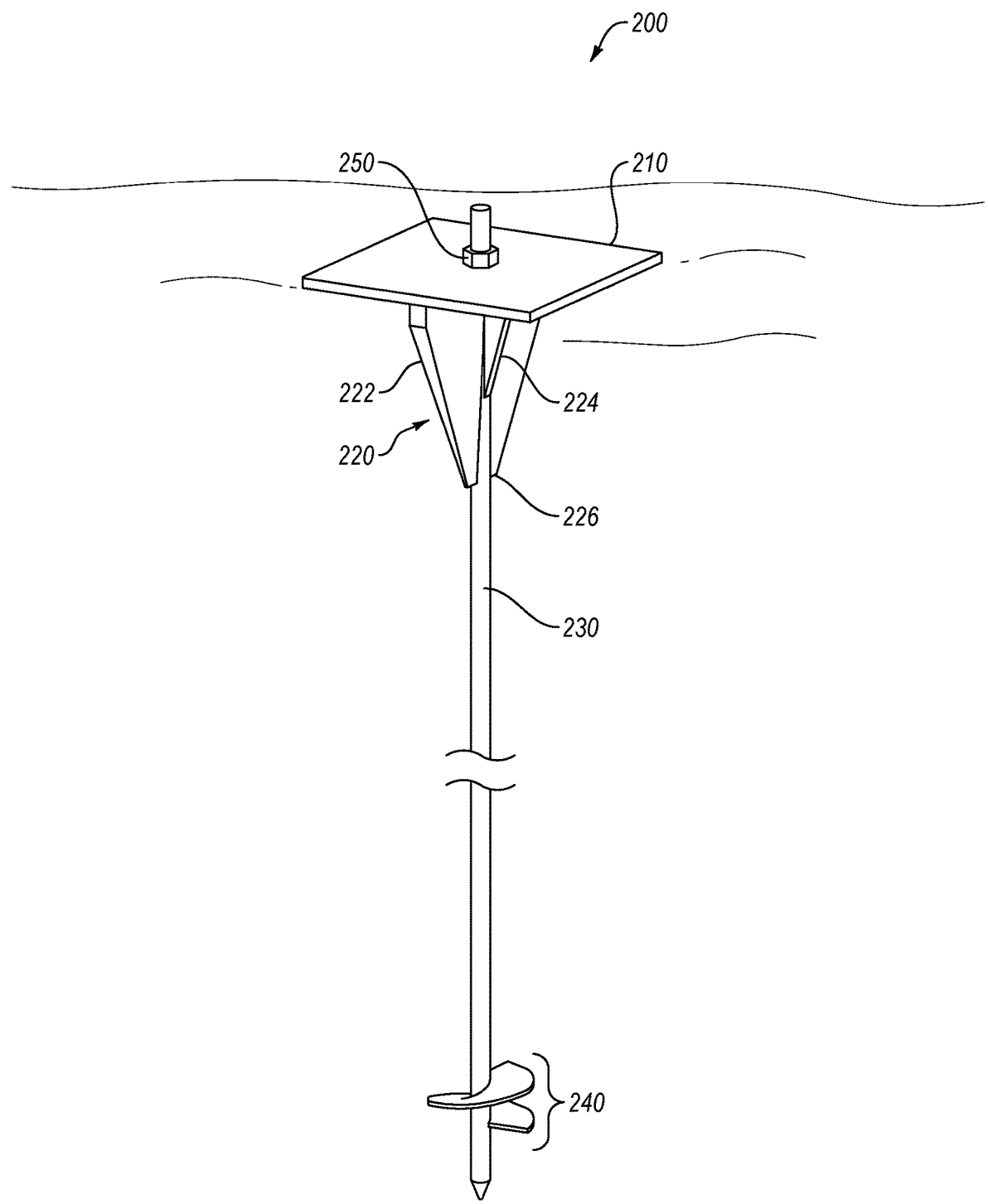
FIG. 2 illustrates another example embodiment of an anchor system in accordance with the present disclosure.

FIG. 2 illustrates another example embodiment of an anchor system 200 in accordance with the present disclosure. The anchor system 200 may be similar or comparable to the anchor system 100 of FIG. 1 with similar elements numbered in a similar manner. For example, the ground plate 210 may be similar or comparable to the ground plate 110, the spade 220 (including the major panel 222, the minor panel 224, and the tip 226) may be similar or comparable to the spade 120 (including the major panel 122, the minor panel 124, and the point 126), and/or the nut 250 may be similar or comparable to the nut 150, all of FIG. 1.

In the anchor system 200, rather than using the earth anchor 140, the line 230 may include a threaded portion 240. The line 230 may be made of a material of sufficient strength that the line 230 may be the shaft of the threaded portion 240 that is rotated to drive the threaded portion 240 into the ground. In these and other embodiments, in addition to tensile strength, the line 230 may have a high torsional strength so that as the line 230 is rotated to drive the threaded portion 240 into the ground, the line 230 withstands the loads placed thereon. For example, the line 230 may be a steel or other metal/alloy column or shaft.

In some embodiments, the increased torsional strength of the line 230 may result in the line 230 having a greater cross-sectional area than the line 130 of FIG. 1. The line 230 may include a solid body or a hollow body. Additionally or alternatively, the line 230 may include any cross-sectional shape, such as a circular cross-section, a square cross-section, a rectangular cross-section, an octagonal cross-section, any other polygonal cross-section, an irregular polygonal cross-section, etc. In these and other embodiments, the hole in the ground plate 210 and/or a void in the spade 220 may be shaped to accommodate the line 230, and the hole in the ground plate 210 and/or the void in the spade 220 may be larger than those of the ground plate 110 and/or spade 120 of FIG. 1.

In operation, deploying the anchor system 200 may include rotating the line 230 to drive the threaded portion 240 into the ground. When the threaded portion 240 has reached the desired depth, the ground plate 210 may be placed over the line 230 and the ground plate 210 may be positioned with the spade 220 in the desired orientation (e.g., with the major panel 222 facing an E-W direction). The ground plate 210 may then be inserted into the ground by forcing the spade 220 into the ground until the ground plate 210 is resting against the surface of the ground. The nut 250 may then be threaded down the line 230 until it is proximate the ground plate 210 and forces the ground plate 210 into the surface of the ground (e.g., using a hydraulic tensioner or nut driver) while adding more tension to the line 230. The tension to the line 230 may provide greater stability and rigidity to the anchor system 200. The threaded portion 240 may resist or prevent the threaded portion 240 and the associated line 230 from being pulled back out of the ground due to its interaction with the earth around it. In some embodiments, the use of the nut 250 may facilitate seating the ground plate 210 against the ground rather than being used after the ground plate 210 is against the ground.

Additionally or alternatively, the ground plate 210 and/or the spade 220 may each include a hollow portion (e.g., a hollowed center) that is shaped and sized to accommodate the line 230 and/or the threaded portion 240. For example, the ground plate 210 may include a hole large enough for the threaded portion 240 to extend through towards the ground. In these and other embodiments, the hollow portion of the ground plate 210 may act as a guide when deploying the threaded portion 240. For example, the spade 220 may include a lip around the end opposite the tip 226 that is larger than the hole for the spade 220 in the ground plate 210 such that the main body of the spade 220 may pass through the hole while the lip catches and holds on the ground plate 210. As another example, the spade 220 and ground plate 210 may be a single physical component with a hollow portion to accommodate the threaded portion 240 and the line 230. As another example, when deploying the spade 220 and ground plate 210, the spade 220 may be positioned so that the major panel 222 is oriented to face in an East-West direction, and the ground plate 210 may be forced into the ground (e.g., via pounding with a tool, stomping with a boot, etc.). After the ground plate 210 is against the surface of the ground, the threaded portion 240 may be placed within the hollow, and a force may be applied to the threaded portion 240 to drive the threaded portion 240 into the ground in a position aligned with the ground plate 210. For example, a rotational force may be applied to the line 230 and/or directly to the threaded portion 240 to force the threaded portion 240 into the ground. After reaching a sufficient depth, a large washer or plate larger than the hollow portion may be placed over the line and a threaded bolt or other fixing device may be used to create tension between the ground plate 210 (via the washer or plate) and the threaded portion 240 deep in the ground. As another example, the hollow may include a central portion sized to accommodate the line 230 in combination with a slot or channel sized to accommodate a portion of the threaded portion as it is rotated and threaded past the ground plate 210 by the threaded portion 240 passing through the slot or channel.

Figure 3C:
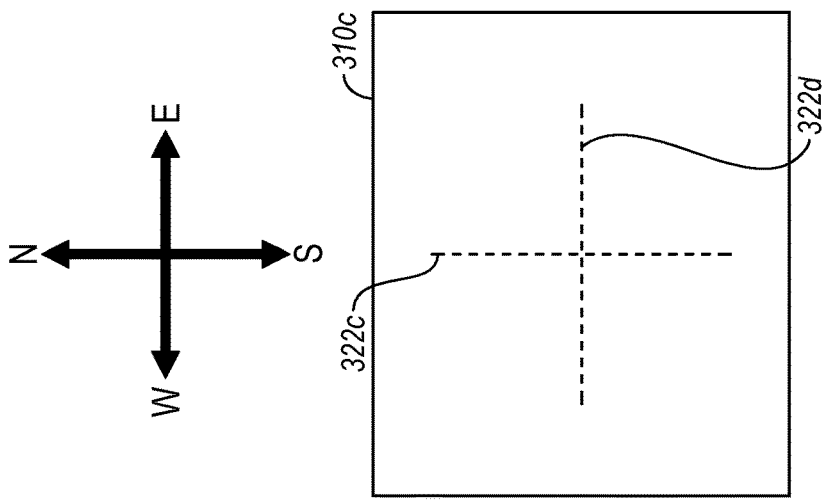
FIGS. 3A-3C illustrate various configurations of a spade of example anchor systems in accordance with the present disclosure.
Figure 3B:
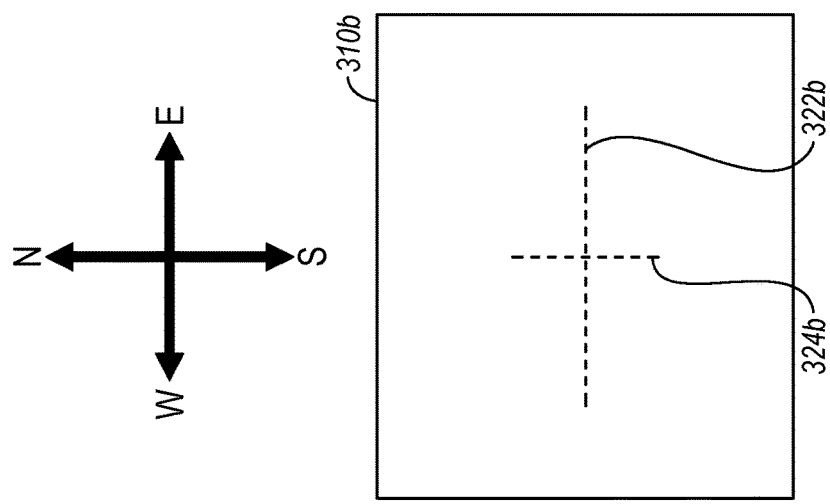
Figure 3A:
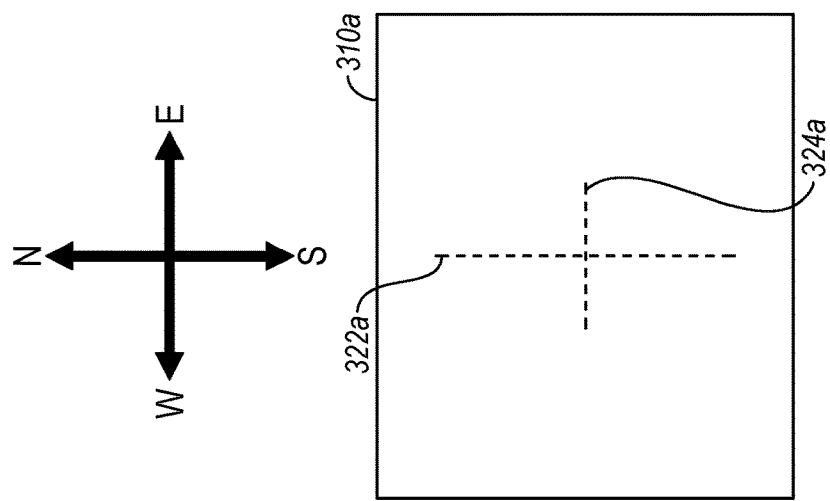

FIGS. 3A-3C illustrate various configurations of a spade of example anchor systems in accordance with the present disclosure. For example, FIGS. 3A, 3B, and 3C illustrate various views of the bottom surface of a ground plate 310 with the orientation of the spade in dashed lines.

As illustrated in FIG. 3A, the spade includes a major panel 322a that is oriented to face in an East-West direction, and a minor panel 324a that is facing in a North-South direction. The major panel 322a may facilitate the resistance of forces as a support structure is rotated to help an array of PV modules track the sun as it crosses the sky. The minor panel 324a may facilitate the resistance of forces such as wind, snow, etc. Additionally or alternatively, the major panel 322a and/or the minor panel 324a may provide support for and/or resist forces related to the weight of PV modules installed on the associated anchor system with or without rotation of the PV modules. For example, the weight force of PV modules installed on a sloped surface may be resisted by the major panel 322a and/or the minor panel 324a of the spade.

As illustrated in FIG. 3B, the spade includes a major panel 322b that is oriented to face in a North-South direction, and a minor panel 324b that is facing in an East-West direction. In such a configuration, the spade may resist forces in the North-South direction more readily than in the East-West direction.

As illustrated in FIG. 3C, the spade may include two major panels 322c and 322d such that there may be greater resistance in both orthogonal directions (East-West and North-South). Providing two major panels 322c and 322d of the spade may provide greater resistance of the forces in both directions while potentially requiring additional force to drive the spade into the ground and/or more material or manufacturing techniques when manufacturing the spade.

Although the major panels 322a-d and the minor panels 324a-b are illustrated as having an orientation in cardinal directions, it may be appreciated that the major panels 322 and/or the minor panels 324 may be implemented with any orientation depending on the environment and/or the forces affecting the anchor system. Additionally or alternatively, it may be appreciated that an angle between the major panels 322 and the minor panels 324 need not be perpendicular or substantially perpendicular, and the angle between the panels may be adjusted depending on the environment and/or the forces affecting the anchor system.

Additionally or alternatively, although the major panels 322 and the minor panels 324 are illustrated as intersecting at approximate midpoints of the major panels 322 and the minor panels 324, it may be appreciated that the major panels 322 and the minor panels 324 may intersect at any point along the panels depending on the environment and/or the forces affecting the anchor system. For example, a given major panel 322 may intersect with an end of a given minor panel 324 such that a cross-section of the spade is a T-shape. As another example, a given major panel 322 may intersect with a given minor panel 324 such that a cross-section of the spade is an L-shape.

In some embodiments, in addition or alternatively to adjusting the size and/or orientation of the spade, the size of the ground plate 310 may be changed. For example, for regions with more ground water, looser soil, etc., the ground plate 310 may be larger while for dry, rocky ground, the ground plate 310 may be smaller. Additionally or alternatively, the shape of the ground plate 310 may be changed (e.g., to any other polygonal and/or non-polygonal shape)

depending on the environment in which the anchor system is implemented and/or the forces acting on the PV module system coupled to the anchor system.

Figure 4A:
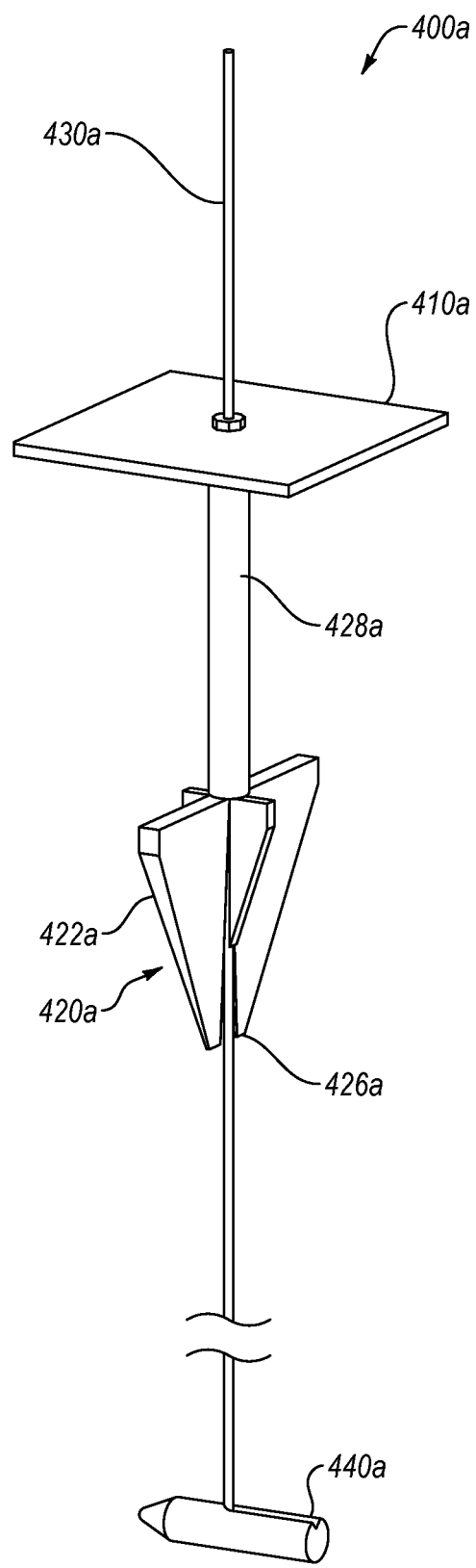
FIG. 4A illustrates an additional example embodiment of an anchor system in accordance with the present disclosure.

FIG. 4A illustrates an additional example embodiment of an anchor system 400a in accordance with the present disclosure. The anchor system 400a may be similar or comparable to the ground plates 110/220, the spade 420a (including the major panel 422a and the point 426a) may be similar or comparable to the spade 120/220 (including the major panel 122/222 and the point 126/226), the line 430a may be similar or comparable to the line 130/230, and/or the earth anchor 440a may be similar or comparable to the earth anchor 140, of FIGS. 1 and/or 2. As illustrated in FIG. 4A, the anchor system 400a may include a neck 428a between the ground plate 410a and the spade 420a. The neck 428a may provide a component that shifts the location of the spade 420a deeper into the ground relative to the ground plate 410a when deployed without requiring a significant change to the profile of the spade 420a and/or requiring an exceptionally long spade 420a (although such an elongated spade is within the scope of the present disclosure). Additionally, the use of the neck 428a may reduce the amount of materials used and/or manufacturing processing required for the anchor system 400a, reducing the cost of components used when deploying an array of PV modules.

In some embodiments, the neck 428a may be made of a similar or comparable material to the ground plate 410a and/or the spade 420a. For example, the neck 428a, ground plate 410a, and spade 420a may be made of a unitary body of material with different functional regions. In some embodiments, the neck 428a may be a hollow tube like a pipe or may be a partially enclosed tube (e.g., a half pipe), a rigid flat section, etc. In some embodiments, the shape, material, and position of the neck 428a may be selected such that force applied to the ground plate 410a is transferred via the neck 428a to the spade 420a to facilitate driving the spade 420a into the ground.

In some embodiments, the ground plate 410a, neck 428a, and/or the spade 420a may include a hollow that is coextensive across all three that is sized and shaped to accommodate the earth anchor 440a. For example, the hole in the ground plate 410a for accommodating the line 430a may be sized larger than the earth anchor 440a, the neck 428a may include a pipe that has an internal diameter larger than the earth anchor 440a, and the spade may have a shape with a circular void for the earth anchor and/or a hollow tube (including through the point 426a) sized larger than the earth anchor 440a. In these and other embodiments, the hollow may act as a barrel or guide when deploying the earth anchor 440a. For example, when deploying the spade 420a and ground plate 410a, the spade 420a may be positioned so that the major panel 422a is oriented to face in an East-West direction, and the ground plate 410a may be forced into the ground (e.g., via pounding with a tool, stomping with a boot, etc.). After the ground plate 410a is against the surface of the ground, the earth anchor 440a may be placed within the hollow, and a force may be applied to the earth anchor 440a to drive the earth anchor 440a into the ground in a position aligned with the ground plate 410a, neck 428a, and spade 420a. For example, a pile driver or other tool that fits within the hollow may be used to force the earth anchor 440a into the ground. As another example, an explosive charge may be used to drive the earth anchor 440a into the ground.

After the earth anchor 440a is at the desired depth in the ground, the line 430a may be tightened and the earth anchor 440a may have its position transitioned to the deployed position in a similar or comparable manner to that described with reference to FIG. 1. For example, the use of a nut, tooth lock washer, etc. may be used to tighten the line 430a, force the spade 420a into the ground, and/or seat the ground plate 410a against the surface of the ground.

In some embodiments, rather than deploying the spade 420a and the ground plate 410a first, the earth anchor 440a with the accompanying line 430a may be deployed first, and the line 430a may be fed through the hollow in the point 426a, the neck 428a, and the ground plate 410a. After the line 430a is within the hollow, the spade 420a, the neck 428a, and the ground plate 410a may be driven into the ground in a similar or comparable manner described herein.

In some embodiments, the neck 428a may be used in embodiments with a line with a threaded portion such as the line 230 with the threaded portion 240 illustrated in FIG. 2. For example, the hollow that is common to the ground plate 410a, neck 428a, and spade 420a may be sized to accommodate the line 230 of FIG. 2. When deploying the ground plate 410a, neck 428a, and spade 420a, the line with the threaded portion may be deployed into the ground first, and then the ground plate 410a, the neck 428a, and the spade 420a may be deployed over the line with the threaded portion and driven into the ground until the ground plate 410a is against the surface of the ground, and a nut may be used to secure the ground plate and add sufficient tension to the line.

Figure 4B:
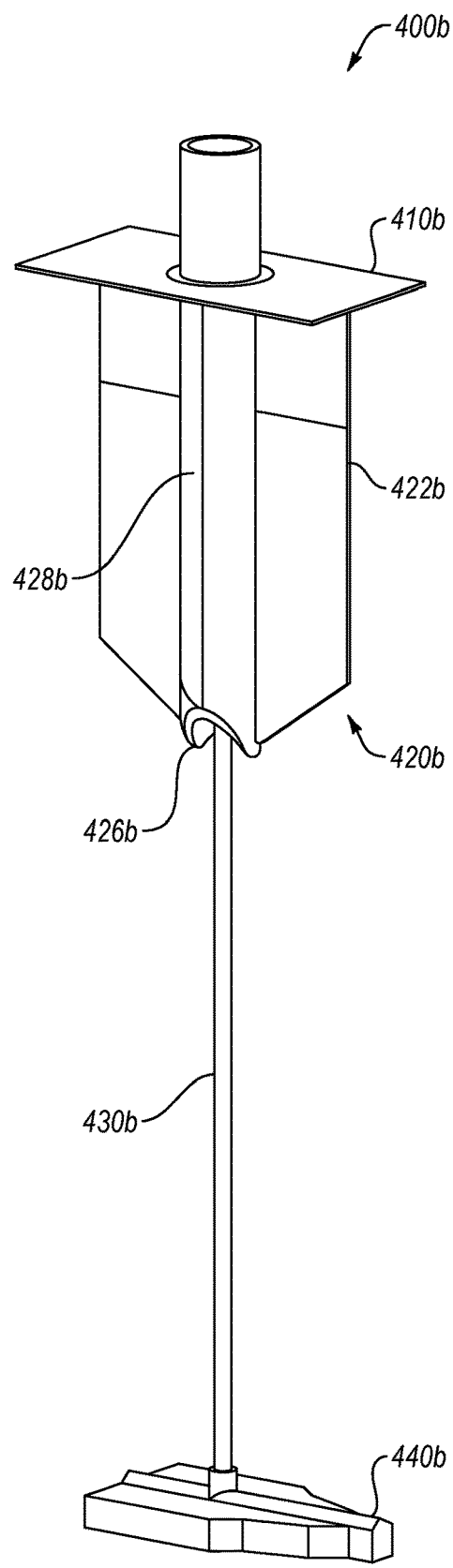
FIG. 4B illustrates another example embodiment of an anchor system in accordance with the present disclosure.

FIG. 4B illustrates another example embodiment of an anchor system 400b in accordance with the present disclosure. The anchor system 400b may be similar or comparable to the anchor system 400a, with example variations in the implementation of the anchor system 400b as compared to the anchor system 400a. For example, the anchor system 400b may include a ground plate 410b, a spade 420b (with a major panel 422b and point 426b), a neck 428b, a line 430b, and an earth anchor 440b.

As illustrated in FIG. 4B, the spade 420b may be coextensive with the neck such that the major panel 422b may maintain a consistent width for more than half of the length. In these and other embodiments, the ground plate 410b, neck 428b, and major panel 422b may all be manufactured of a single unitary component Additionally or alternatively, the ground plate 410b and the major panel 422b of the spade 420b may be manufactured of a single unitary component, and the neck 428b may then be inserted in a slot left for the neck 428b. The neck 428b may or may not be adhesively secured, welded, soldered, or otherwise affixed in place.

In some embodiments, the increased surface area of the major panel 422b may facilitate the use of the ground plate 410b with a smaller surface area relative to the spade 420b than the relative surface area of the ground plate 410a to the spade 420a. In some embodiments, the line 430b may include heavier material than the line 430a and/or the earth anchor 440b may be driven to a deeper depth than the earth anchor 440a to provide more resistance to loads.

In some embodiments, the variations between the anchor systems 400a and 400b may be based on differences in soil, weather conditions, etc. between two locations. As will be appreciated, the implementations illustrated in FIGS. 4A and 4B are only examples, and other variations are within the scope of the present disclosure.

FIGS. 5A-5D illustrate various configurations of a neck 528 of example anchor systems 500a-500d in accordance with the present disclosure. The anchor systems 500a-500d may be similar or comparable to the anchor systems 100, 200 and/or 400 of FIGS. 1, 2, and 4. For example, the anchor systems 500a-500d may include a ground plate 510 and spade 520. The neck 528 may couple the spade 520 to the ground plate 510 and may include various lengths as can be observed by the necks 528a, 528b, 528c, and 528d.

In some embodiments, the length of the neck 528 may vary depending on the soil type and/or the composition of the soil where an array of PV modules may be deployed. For example, a soil analysis may be performed initially at a location in which the array of PV modules is to be deployed. Based on the soil composition, one or more types of anchor systems may be used with a correspondingly sized neck 528, orientation of the spade 520, size or orientation of the ground plate 510, etc. Additionally or alternatively, the soil composition may be used in the determination of whether an earth anchor, screw anchor (e.g., line with threaded portion), etc. is to be used.

For example, as illustrated in FIG. 5A, a first soil sample 561a corresponding to a first location may be obtained that shows an initial layer of topsoil, followed by a sandy layer, followed by harder soil layer with intermittent small rocks. The length of the neck 528a may be a first length to provide support and depth of the spade commensurate with the soil composition at the first location.

As illustrated in FIG. 5B, a second soil sample 561b corresponding to a second location may be obtained that shows an initial layer of loose topsoil, followed by a layer of mostly compacted rocks. The length of the neck 528b may be a second length shorter than the first length to provide support and depth of the spade commensurate with the soil composition at the second location.

As illustrated in FIG. 5C, a third soil sample 561c corresponding to a third location may be obtained that shows almost uniform soil of mostly rocks. The length of the neck 528c may be a third length shorter than the first and the second lengths to provide support and depth of the spade commensurate with the soil composition at the third location.

As illustrated in FIG. 5D, a fourth soil sample 561d corresponding to a fourth location may be obtained that shows an initial layer of loose topsoil, followed by a layer of loose sand, followed by a layer of more compacted sand, followed by a layer of small compacted rock. The length of the neck 528d may be a fourth length longer than all the other lengths to provide support and depth of the spade commensurate with the soil composition at the fourth location.

The examples illustrated in FIGS. 5A-5D illustrate one set of examples of customization of the length of the neck 528 based on the soil properties at a location of an array of PV modules. It will be appreciated that any number of samples with any number of properties may be obtained, with any customization of the anchor system based on the properties of the location of the array of PV modules. In some embodiments, the customization of the anchor system may also or alternatively take into consideration environmental factors, such as a direction and velocity the wind typically blows or the amount of ground-water in the soil, bearing strength of the soil, etc., the size of the array, the length of the support structures of the array, whether the array includes a fixed orientation, whether the array uses single- or dual-axis tracking, etc. In some embodiments, there may be a set number of configurations from which the customized version of the anchor system is selected.

In some embodiments, a method for customization of the anchor system may include obtaining an environmental study of a location of an array of PV modules (which may include a soil sample analysis, among other considerations). The method may also include selecting at least one of a length of a neck of the anchor system, a size of the ground plate, an orientation of the spade, and an anchoring mechanism. The method may additionally include sending a set number of anchor systems to the location of the array of PV modules, and installation of the anchor systems as identified in the selection.

While illustrated as the neck extending until solid rock or mainly rock is reached, it will be appreciated that the neck need not extend the spade until it reaches rock. For example, the spade may extend (via the neck) into sand, topsoil, clay, etc. without extending into rock and still be consistent with the present disclosure.

Figure 6:
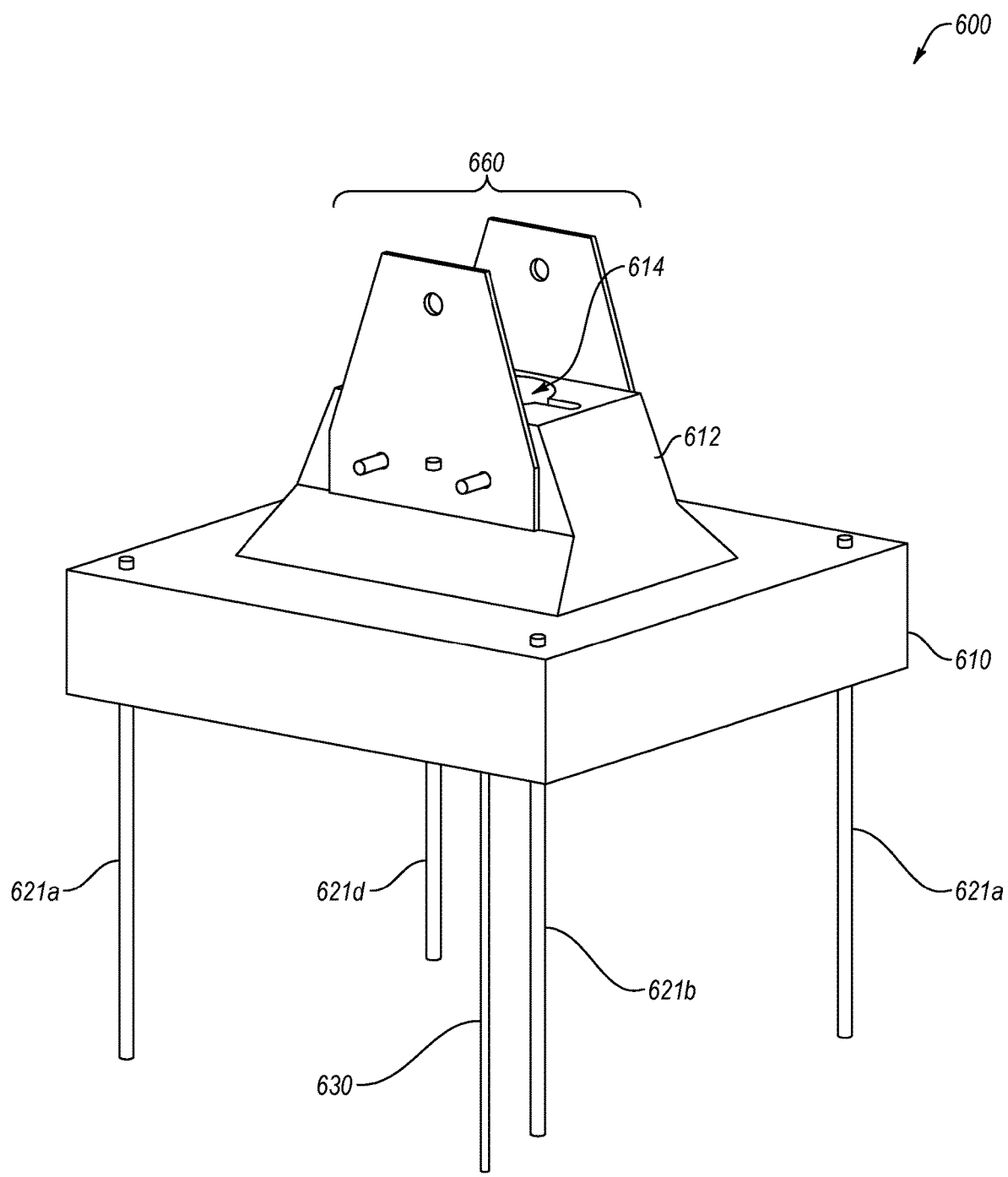
FIG. 6 illustrates an example ballast of another example embodiment of an anchor system in accordance with the present disclosure.

FIG. 6 illustrates an example ballast 610 of another example embodiment of an anchor system 600 in accordance with the present disclosure. As illustrated in FIG. 6, the anchor system 600 may utilize the ballast 610 with rods 621 (such as the rods 621a-621d) extending into the ground to provide resistance to transverse loads, and using an earth anchor or screw anchor (not shown) at the end of a line 630 for tensile strength in the longitudinal direction.

The ballast 610 may be made of a sturdy material, such as cement, concrete, metal, sturdy plastic, etc. and may operate as a foundational component for an array of PV modules. The ballast 610 may include a mounting block 612 to which one or more mounting brackets 660 may be attached. The mounting block 612 may include an access hole 614 through which the earth anchor or screw anchor may be deployed into the ground.

In some embodiments, the rods 621 may include rebar or other metal components cast into the concrete of the ballast 610. In operation, the ballast 610 may be placed in position and the rods 621 may be pounded into the ground, eventually settling the ballast 610 directly against or into the ground. Additionally or alternatively, the rods 621 may be movable vertically relative to the ballast 610 such that the ballast may be placed flat on the ground with the rods 621 either not yet in the ballast 610 or sticking upwards and away from the ground in the ballast 610. After being placed in position, the rods 621 may be pounded through the ballast 610 and into the ground. In these and other embodiments, the rods 621 may be replaced with a threaded component that may be driven into the ground using a rotational force rather than a pounding force. Additionally or alternatively, the rods 621 may each include a spade, such as the spade 120, the spade 220, the spade 420a, and/or the spade 420b as described in relation to FIGS. 1, 2, 4A, and/or 4B, respectively.

Figure 7A:
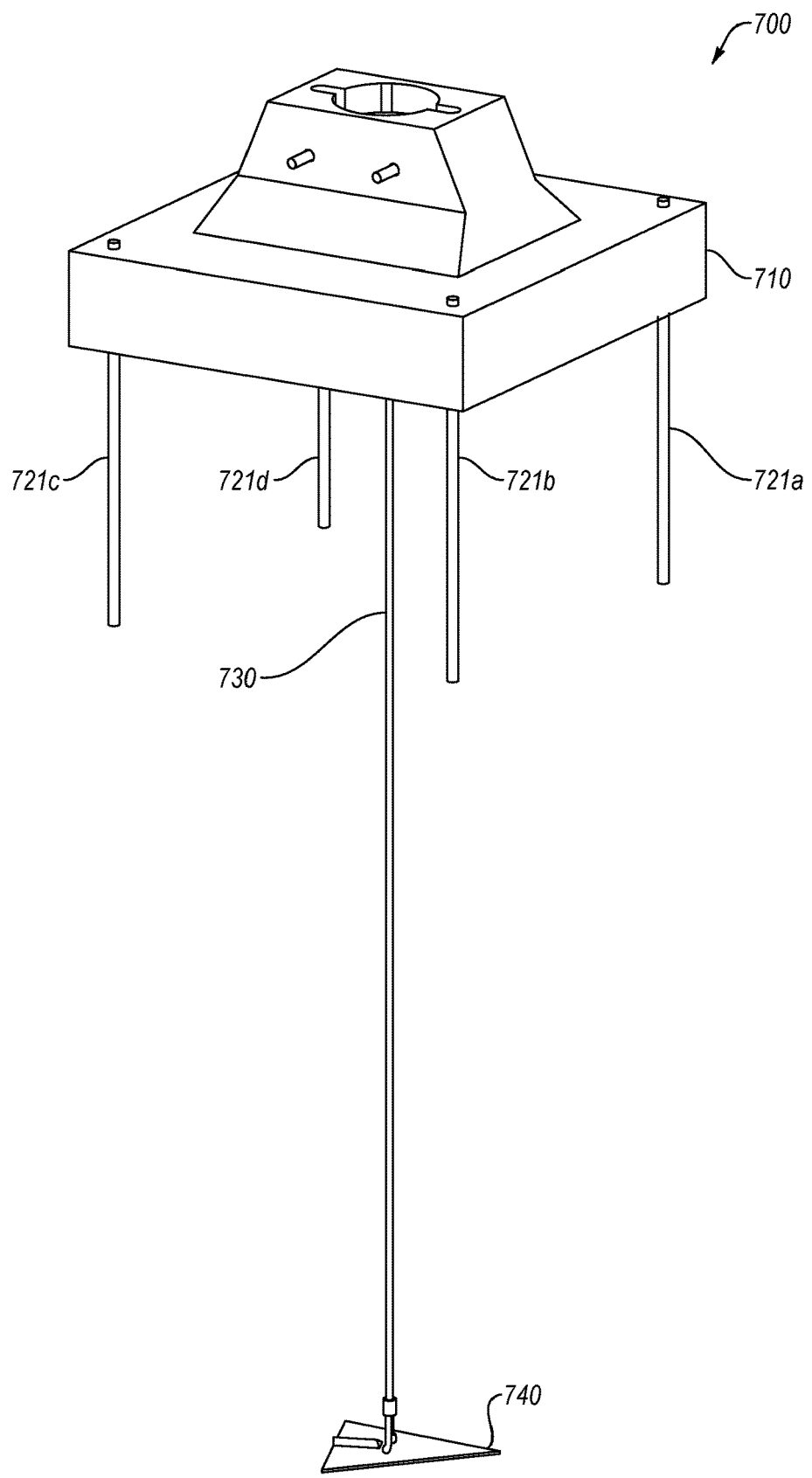
FIGS. 7A-7C illustrate various views of an example anchor system using the ballast of FIG. 6 in accordance with the present disclosure.
Figure 7B:
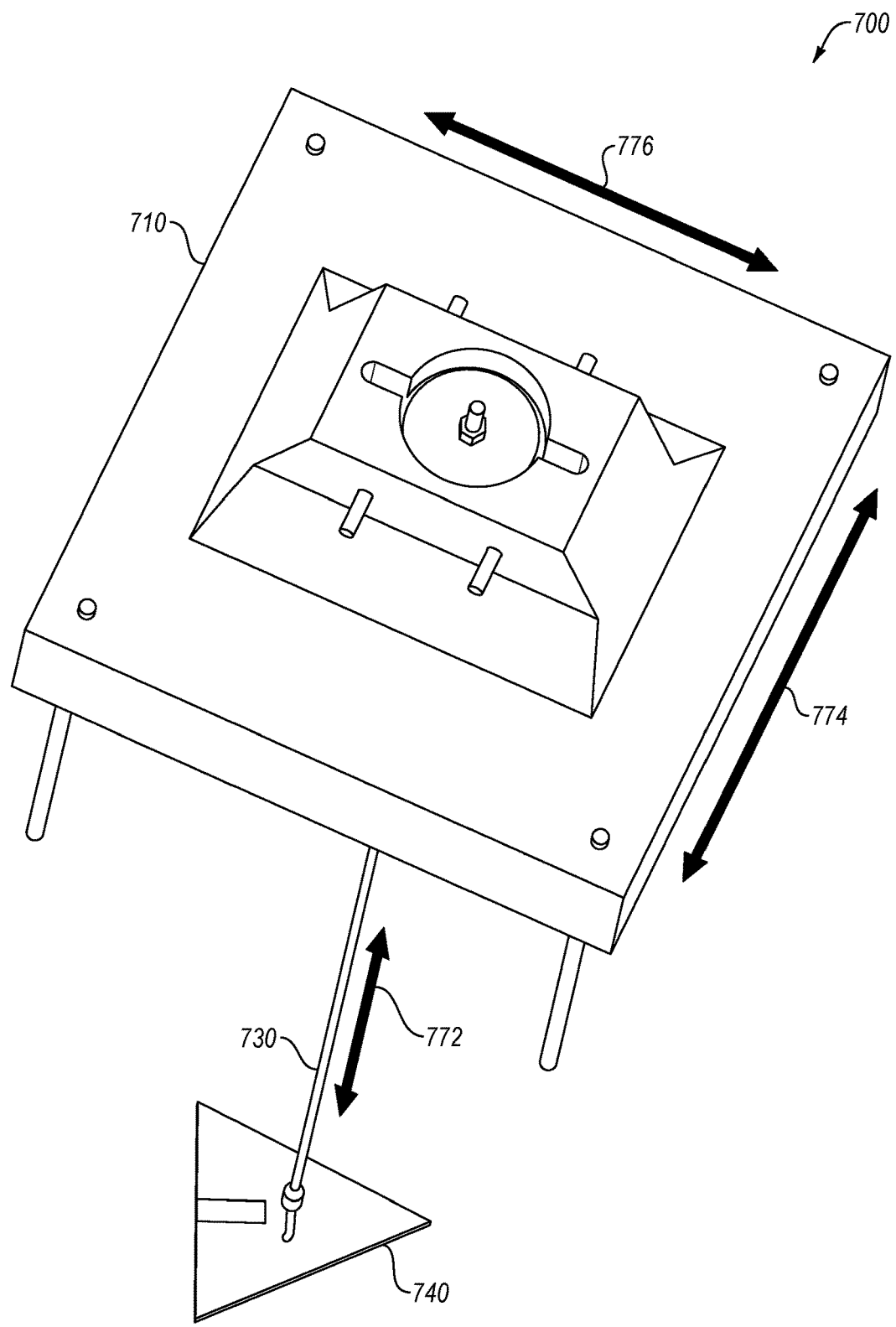
Figure 7C:
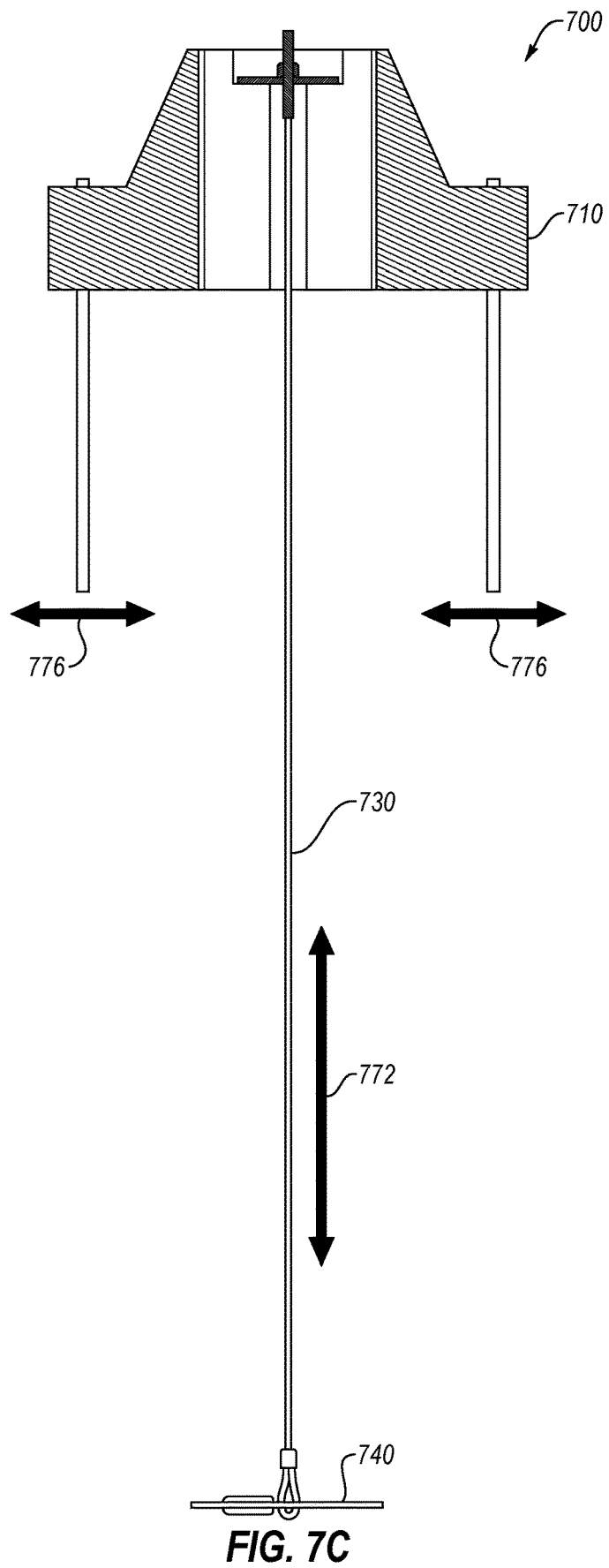

FIGS. 7A-7C illustrate various views of an example anchor system 700 using the ballast of FIG. 6 in accordance with the present disclosure. For example, the ballast 710 may be similar or comparable to the ballast 610, the rods 721a-721d may be similar or comparable to the rods 621a-621d, and the line 730 may be similar or comparable to the line 630. The anchor system 700 may include an earth anchor 740 that may be similar or comparable to the earth anchors 140 and/or 440a/440b of FIGS. 1A and 4A/4B.

As illustrated in FIGS. 7B and 7C, the rods 721 may resist the transverse loads 774/776. For example, forces applied to the ballast 710 and/or structures supported thereon may be resisted in the transverse direction by the rods 721 driven into the ground.

As illustrated in FIGS. 7B and 7C, the line 730 tensioned between the earth anchor 740 and the ballast 710 may resist the longitudinal load 772. For example, forces applied to the ballast 710 and/or structures supported thereon may be resisted in the longitudinal direction by the line 730 tensioned between the earth anchor 740 and the ballast 710.

By using the combination of the rods 721 with the line 730 and earth anchor 740, loads in each of the three dimensions of space may be resisted, providing a stable framework upon which the array of PV modules may be mounted.

Figure 8:
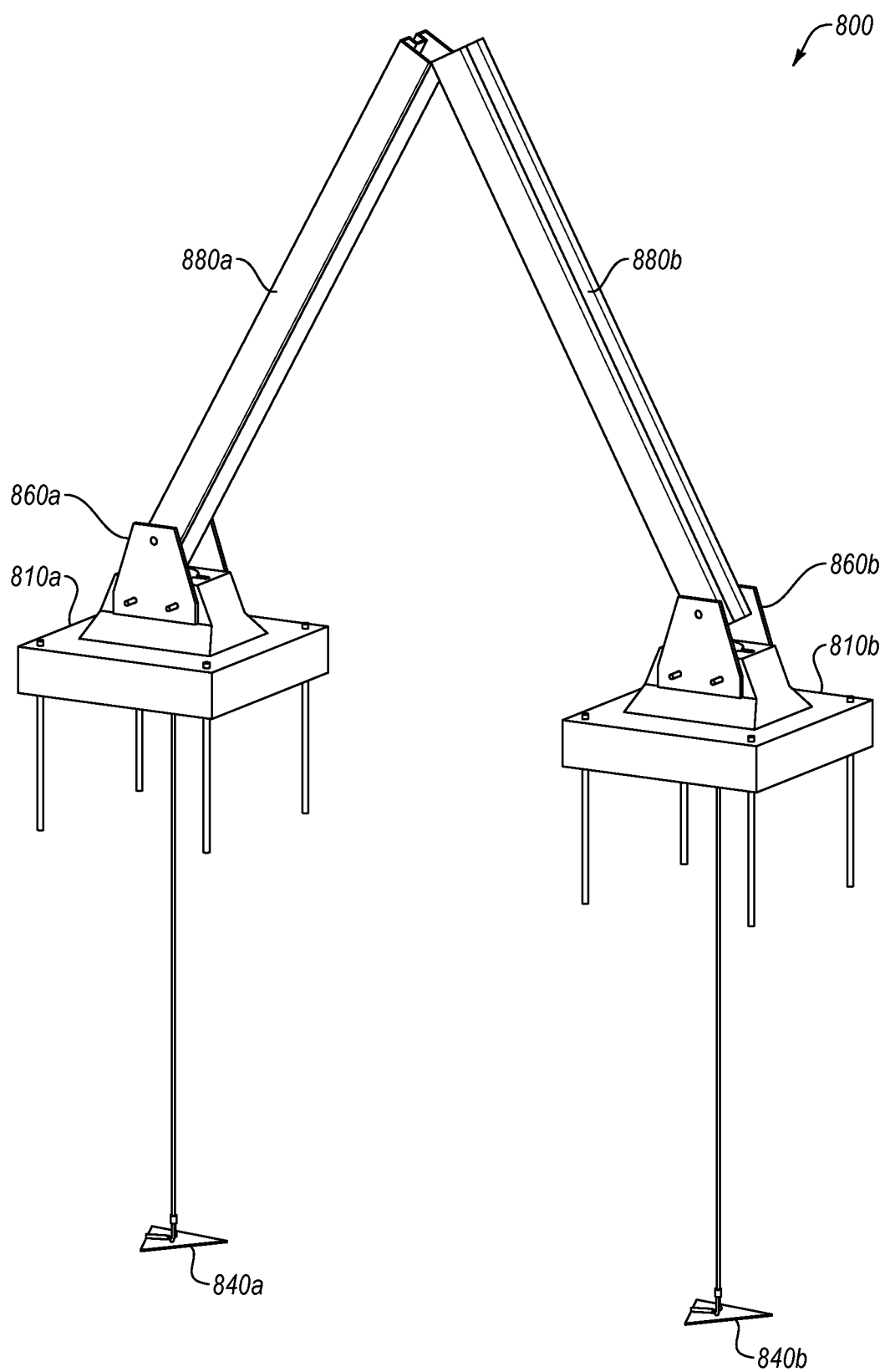
FIG. 8 illustrates an example of the anchor system of FIGS. 7A-7C with support structure attached, in accordance with the present disclosure.

FIG. 8 illustrates an example of the anchor system of FIGS. 7A-7C with support structure attached, in accordance with the present disclosure. The anchor system 800 may be similar or comparable to the anchor system 600 and/or 700 of FIGS. 6-7C. For example, the ballasts 810*a* and 810*b* may be similar or comparable to the ballasts 610 and 710, the earth anchors 840*a* and 840*b* may be similar or comparable to the earth anchor 740, and the mounting brackets 860*a* and 860*b* may be similar or comparable to the mounting bracket 660. Additionally or alternatively, the anchor system 800 may be similar to or the same as the anchor systems 100-500 as described in relation to FIGS. 1-5D.

In operation, after the earth anchors 840*a* and 840*b* are deployed and the rods are driven into the ground, truss arms 880*a* and 880*b* may be mounted to the mounting brackets 860*a* and 860*b*. The truss arms 880*a* and 880*b* may operate as the foundational support structure for an array of PV modules to which other components may be mounted (such as a torque tube, mounting rail for PV module frames, etc.). In these and other embodiments, a number of earth anchors 840, ballasts 810, and/or mounting brackets 860 needed to support a given array of PV modules may depend on the configuration, weight, and/or any other considerations related to the given array of PV modules. As such, a single earth anchor 840, ballast 810, mounting bracket 860, and/or truss arm 880 may be used to support a section of a given array of PV modules. Additionally or alternatively, the anchor system 800 may include more than two earth anchors 840, ballasts 810, mounting brackets 860, and/or truss arms 880 to support a section of a given array of PV modules.

In some embodiments, the entire assembly of the pair of ballasts 810*a* and 810*b*, mounting brackets 860*a* and 860*b*, and the truss arms 880*a* and 880*b* may be preassembled before installation at a site such that the entire assembly illustrated in FIG. 8 may be shipped, delivered, and installed at the site.

Figure 9:
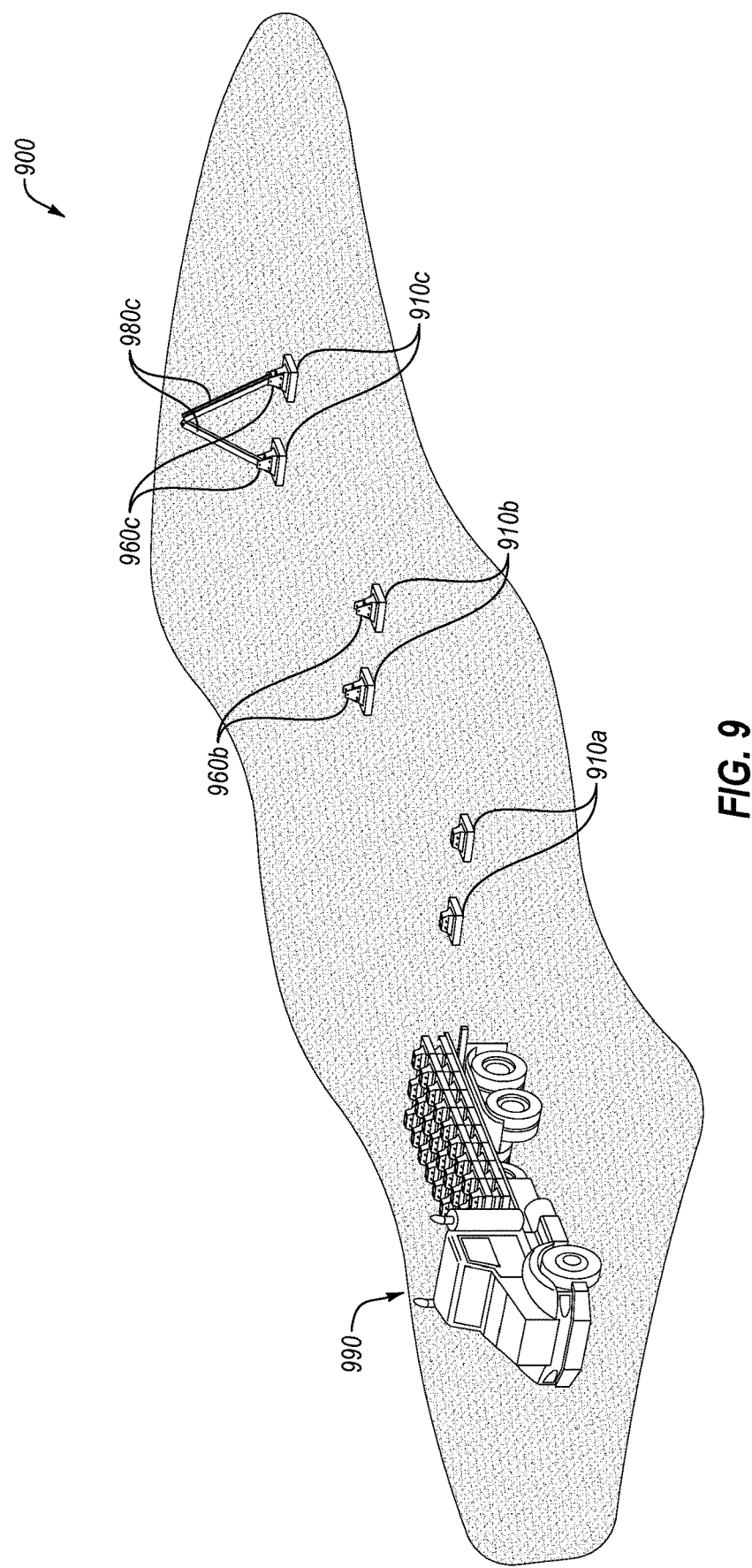
FIG. 9 illustrates an example of installation of the anchor system of FIGS. 7A-7C, in accordance with the present disclosure.

FIG. 9 illustrates an example of installation of the anchor system consistent with that illustrated in FIGS. 6-8, in accordance with the present disclosure.

As illustrated in FIG. 9, an installation process 900 may include a truck 990 being loaded with a large number of ballasts 910 and/or other installation hardware and being deployed to a site. The ballasts 910 may be offloaded from the truck 990 such that installation may proceed.

The ballasts 910*a* may be those recently offloaded from the truck 990. The ballasts 910*b* may be those that have been deployed, had the rods driven into the ground, and the earth anchor deployed. Afterwards, the ballasts 910*b* may have the mounting brackets 960*b* attached thereto. The ballasts 910*c* may be deployed as the ballasts 910*b* and have the mounting brackets 960*c* attached thereto. Additionally, the truss arms 980*c* may be coupled to the mounting brackets 960*c*.

By using the approach illustrated in FIG. 9, the truck 990 may drive through a site and offload the ballasts 910 at periodic locations. The support framework for the arrays of PV modules may then be deployed in a successive manner by deploying the ballasts 910, attaching the mounting brackets 960, and attaching the truss arms 980. For example, the ballasts 910 may be positioned and aligned to their proper location for installation of the array of PV modules, the rods may be driven into the ground, and then the earth anchor may be deployed. After stabilizing the ballast 910, the mounting brackets 960, truss arms 980 and any other supporting structure may be attached to the ballast 910.

In some embodiments, the mounting brackets 960 and/or the truss arms 980 may be attached to the ballasts 910 prior to driving the rods into the ground and/or deploying the earth anchor. By doing so, the position of the ballasts may be moved around after being offloaded from the truck 990 to the ideal or proper location for installation, and then may be deployed. By having the mounting brackets 960 and/or the truss arms 980 attached, it may be easier for an installer to verify the position of the entire framework, the angle of the truss arms 980, a deployed height of the truss arms 980, etc. as the ballasts 910 may be moved to adjust for variations in terrain, etc.

Additionally or alternatively, the installation process 900 may be applied to installation of the anchor systems 100-500 as described in relation to FIGS. 1-5D. For example, the anchor systems 100 may be loaded on the truck 990 and offloaded at periodic locations like the ballasts 910 at which the anchor systems 100 may be deployed as described above in relation to FIG. 1.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. It is noted that any of the dependent examples or portions thereof may be combined in any combination, and placed into an independent example, e.g., Examples 1, 2, and 3. The other examples can be presented in a similar manner. The following is a non-limiting summary of some examples presented herein.

Example 1 includes an anchor system that may include a base member that includes stabilizing shafts projecting through the base member such that in a deployed position, the stabilizing shafts extend away from the base member and into the ground. The anchor system may include an anchor deployable into the ground with a line for providing tension between the base member and the anchor when deployed into the ground. The anchor system may include mounting hardware atop the base member.

In some examples, the stabilizing shafts may include rods or spades.

In some examples, the base member may include a ballast or a ground plate.

In some examples, each of the stabilizing shafts extending away from the base member may include a threaded surface such that the stabilizing shafts are configured to be driven into the ground by a rotational force.

In some examples, the anchor may include an earth anchor shaped to be deployed in a first position and resist removal from the ground in a second position, and tension on the line may cause the earth anchor to transition from the first position to the second position.

In some examples, the anchor system may further comprise one or more truss arms attached to the mounting hardware atop the base member, wherein the each of the truss arms is configured to be attached to one or more support structures of a photovoltaic module.

Example 2 includes an anchor system that may include a base member with a stabilizing shaft coupled to the base member, the stabilizing shaft to be pressed into the ground when deployed. The anchor system may include an earth anchor shaped to be deployed in a first position and resist removal from the ground in a second position and a line running from the base member to the earth anchor. Tension on the line may cause the earth anchor to transition from the first position to the second position.

In some examples, the stabilizing shafts may include rods or spades.

In some examples, the base member may include a ballast or a ground plate.

In some examples, the stabilizing shaft may include a major panel oriented in a first direction and a minor panel oriented in a second direction. In these and other examples, the minor panel may include a smaller surface area than the major panel. In these and other examples, the second direction in which the minor panel is oriented may be orthogonal to the first direction in which the major panel is oriented.

In some examples, the anchor system may further comprise a neck component between the base member and the stabilizing shaft. In these and other examples, the base member, the neck, and the stabilizing shaft may each include a hollow body, wherein the hollow bodies of the base member, the neck, and the stabilizing shaft are coextensive with respect to each of one another and are sized and shaped to accommodate the earth anchor.

Example 3 includes an anchor system that may include a base member with a stabilizing shaft coupled to the base member in which the stabilizing shaft is pressed into the ground when deployed. The anchor system may include a line running from the base member to a threaded portion of the line, and the threaded portion of the line may be shaped to be driven into the ground by rotating a portion of the line above the threaded portion to affect rotation of the threaded portion of the line.

In some examples, the stabilizing shaft may include a rod or a spade.

In some examples, the base member may include a ballast or a ground plate.

In some examples, the stabilizing shaft may include a major panel oriented in a first direction and a minor panel having a smaller surface area than the major panel oriented in a second direction. In these and other examples, the minor panel may include a smaller surface area than the major panel. In these and other examples, the second direction in which the minor panel is oriented may be orthogonal to the first direction in which the major panel is oriented.

In some examples, the anchor system may further comprise a neck component between the base member and the stabilizing shaft. The base member, the neck, and the stabilizing shaft may each include a hollow body, wherein the hollow bodies of the base member, the neck, and the stabilizing shaft are coextensive with respect to each of one another and are sized and shaped to accommodate the earth anchor.

Modifications, additions, or omissions may be made to any of FIGS. 1-9 of the present disclosure. For example, changes as described herein may be made in accordance with the knowledge of a person of ordinary skill in the art. For example, the support structure couplers may take different forms, with different numbers and orientations of components such as fingers, etc. As another example, mounting assemblies of the PV modules may take different forms, with different fastener components such as spring clips, different connection configurations to torque tubes, etc.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Relative terms used in the present disclosure and especially in the appended claims (e.g., bodies of the appended claims) are generally intended as falling within manufacturing tolerances and/or within scope reasonably understood by a person of skill in the art. For example, if two components are identified as being the "same" size, there may be variations consistent with manufacturing variances. Terms describing "approximately," "similar," "substantially," or other terms designating similarity may convey within ten percent of the comparative value. For example, two components that are approximately the same size would be understood to be of a size within ten percent of each other.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An anchor system, comprising:
    a base member that includes one or more stabilizing shafts extending from a surface of the base member such that in a deployed position, the stabilizing shafts extend away from the base member and into the ground, each of the stabilizing shafts including:
        a first panel oriented in a first direction; and
        a second panel oriented in a second direction,
        wherein the first direction corresponds to a direction of one or more forces experienced by a photovoltaic module support structure coupled to the anchor system, the one or more forces being caused by tilting of one or more photovoltaic modules coupled to the photovoltaic module support structure;
    an anchor deployable into the ground with a line for providing tension between the base member and the anchor when deployed into the ground; and
    mounting hardware atop the base member configured to interface with the photovoltaic module support structure.

2. The anchor system of claim 1, wherein the stabilizing shafts are selected from a group consisting of: rods and spades.

3. An anchor system, comprising:
    a base member with a stabilizing shaft coupled to the base member, the stabilizing shaft including:
        a first panel oriented in a first direction; and
        a second panel oriented in a second direction,
        wherein the first panel is larger than the second panel and oriented in a direction of a rotational force imposed on a photovoltaic module support structure coupled to the anchor system, the rotational force being caused by tilting of one or more photovoltaic modules associated with the photovoltaic module support structure;
    an earth anchor shaped to be deployed in a first position and resist removal from the ground in a second position; and
    a line shaped to run from the base member to the earth anchor,
    wherein tension on the line when run from the base member to the earth anchor causes the earth anchor to transition from the first position to the second position.

4. The anchor system of claim 1, wherein the base member is selected from a group consisting of: a ballast and a ground plate.

5. The anchor system of claim 1, wherein:
    the anchor includes an earth anchor shaped to be deployed in a first position and resist removal from the ground in a second position; and
    tension on the line causes the earth anchor to transition from the first position to the second position.

6. The anchor system of claim 1, further comprising one or more truss arms attached to the mounting hardware atop the base member, wherein the each of the truss arms is configured to be attached to one or more support structures of a photovoltaic module.

7. The anchor system of claim 1, wherein:
    the first panel intersects the second panel such that a cross-section of the stabilizing shaft includes a cross-shape; and
    the first direction and the second direction are perpendicular to one another.

8. The anchor system of claim 3, wherein the second direction in which the second panel is oriented is orthogonal to the first direction in which the first panel is oriented.

9. The anchor system of claim 3, wherein the stabilizing shaft is selected from a group consisting of: a rod and a spade.

10. The anchor system of claim 3, wherein the base member is selected from a group consisting of: a ballast and a ground plate.

11. The anchor system of claim 3, wherein the first panel intersects the second panel such that a cross-section of the stabilizing shaft includes a cross-shape.

12. The anchor system of claim 3, wherein the second panel includes a smaller surface area than the first panel.

13. The anchor system of claim 3, further comprising a neck component between the base member and the stabilizing shaft, wherein the base member, the neck component, and the stabilizing shaft each include a hollow body, wherein the hollow bodies of the base member, the neck component, and the stabilizing shaft are coextensive with respect to each of one another and are sized and shaped to accommodate the earth anchor.

14. An anchor system, comprising:
    a base member with a stabilizing shaft coupled to the base member, the stabilizing shaft configured to engage with the ground when in a deployed position, the stabilizing shaft including:
        a first panel oriented in a first direction; and
        a second panel oriented in a second direction,
        wherein the first direction corresponds to a direction of one or more forces experienced by a photovoltaic module support structure coupled to the anchor system, the forces being caused by tilting of one or more photovoltaic modules coupled to the photovoltaic module support structure;
    a line running from the base member to a threaded portion of the line, the threaded portion of the line shaped to be driven into the ground by rotating a portion of the line above the threaded portion to affect rotation of the threaded portion of the line.

15. The anchor system of claim 14, wherein the stabilizing shaft is selected from a group consisting of: a rod and a spade.

16. The anchor system of claim 14, wherein the base member is selected from a group consisting of: a ballast and a ground plate.

17. The anchor system of claim 14, wherein the stabilizing shaft includes a major panel oriented in a first direction and a minor panel oriented in a second direction.

18. The anchor system of claim 17, wherein the minor panel includes a smaller surface area than the major panel.

19. The anchor system of claim 17, wherein the second direction in which the minor panel is oriented is orthogonal to the first direction in which the major panel is oriented.

20. The anchor system of claim 14, further comprising a neck component between the base member and the stabilizing shaft, wherein the base member, the neck component, and the stabilizing shaft each include a hollow body, wherein the hollow bodies of the base member, the neck component, and the stabilizing shaft are coextensive with respect to each of one another and are sized and shaped to accommodate the threaded portion of the line.

* * * * *